United States Patent [19]

Noe

[11] Patent Number: 4,569,867

[45] Date of Patent: Feb. 11, 1986

[54] LAMP GLASS ENVELOPE

[75] Inventor: Raymond J. Noe, Warren, Ohio

[73] Assignee: General Electric Company, Schenectady, N.Y.

[21] Appl. No.: 741,029

[22] Filed: Jun. 3, 1985

Related U.S. Application Data

[63] Continuation of Ser. No. 519,437, Aug. 1, 1983, abandoned.

[51] Int. Cl.[4] .............................................. H01K 1/00
[52] U.S. Cl. ................................... 428/35; 220/2.1 R; 313/113; 313/116; 313/117; 313/634; 362/363; 362/348
[58] Field of Search .............................. 362/363, 348; 220/2.1 R; 313/113, 116, 117, 634

[56] References Cited

U.S. PATENT DOCUMENTS

| | | | |
|---|---|---|---|
| 3,020,435 | 2/1962 | Mead | 313/117 |
| 3,372,826 | 3/1968 | Heaton et al. | 215/12 |
| 3,694,178 | 9/1972 | Hennequin | 65/261 |
| 3,716,136 | 2/1973 | Birner et al. | 209/82 |
| 3,729,301 | 4/1973 | Heaton et al. | 65/81 |
| 3,729,302 | 4/1973 | Heaton | 65/105 |
| 3,885,181 | 5/1975 | Nelson et al. | 220/2.1 R |

FOREIGN PATENT DOCUMENTS 0937825  9/1963  Canada ................................. 313/116

Primary Examiner—George F. Lesmes
Assistant Examiner—P. R. Schwartz
Attorney, Agent, or Firm—J. F. McDevitt; Philip L. Schlamp; Fred Jacob

[57] ABSTRACT

A method and apparatus for producing the type lamp glass envelope used in a reflector lamp is disclosed which employs a ribbon machine. Said ribbon formed lamp glass envelope includes a cylindrical neck portion terminating at one end in a curved reflector portion closed by an integral flattened face portion of lesser curvature with light distributing elements being formed on the exterior surface of said face portion. In its preferred embodiments, the reflector portion of said lamp glass envelope is of the PAR type which can further include truncation of the parabolic shape with opposing substantially flattened parallel surfaces as well as face portions for said lamp glass envelope which can be circular or rectangular in shape. A novel mold construction permitting said lamp glass envelope to be blown on a ribbon machine includes a pair of cooperating halves to form the sides of the curved glass envelope in a central cavity and which terminate at the ends of said cavity in a separate curved or flat base part which undergoes reciprocal motion in a vertical direction during said manufacturing process.

6 Claims, 4 Drawing Figures

LAMP GLASS ENVELOPE

This application is a continuation of application Ser. No. 519,437, filed Aug. 1, 1983, now abandoned.

CROSS-REFERENCE TO RELATED APPLICATION

My U.S. patent application Ser. No. 519,436, now abandoned, filed concurrently herewith, for "Ribbon Blown Glass Article" and assigned to the assignee of the present invention, pertains to a glass envelope formed on a ribbon machine so that it terminates in a non-spherical or flat base.

BACKGROUND OF THE INVENTION

This invention relates to forming the lamp glass envelope for reflector type lamps on a ribbon machine wherein a novel mold construction is employed having three basic parts which cooperate in forming a bulb shape of generally parabolic contour and which terminates in a flattened face portion having light distributing elements formed on the exterior surface thereof.

The lamp glass envelopes customarily employed for reflector lamps such as PAR lamps and automotive headlamps are now formed by pressing separate reflector and lens parts in glass molds requiring not only relatively thick cross-sections for each part but further require that these parts be fusion sealed together during the lamp manufacture. Light distributing elements are located on the inner surface of the conventional lens members to shape the beam pattern of light emerging from the reflector surface which further requires an accurate registration with the conventional reflector members to do so effectively. A serious problem has long been recognized with said conventional pressed lamp constructions arising from the lack of proper registration when these separate lens and reflector members are fusion sealed together.

Accordingly, an important object of the present invention is to provide a lamp glass envelope for a reflector lamp having a unitary integral construction which includes the reflector and lens portions when said lamp glass envelope is initially formed.

Another important object of the present invention is to reduce the amount of glass customarily employed in the lamp glass envelope of a reflector lamp as well as significantly reduce the difficulties now encountered with lack of proper alignment between the lens and reflector portions in pressed type lamp constructions.

Still a further important object of the present invention is to provide an improved method for manufacture of said novel unitary lamp glass envelope on a ribbon machine by means of a novel mold design.

SUMMARY OF THE INVENTION

In accordance with the present invention, the novel ribbon formed lamp glass envelope for a reflector type lamp includes a cylindrical neck portion terminating at one end in a curved reflector portion closed by an integral flattened face portion of lesser curvature with light distributing elements being formed in the exterior surface of said face portion. Said lamp glass envelope can be formed with hard or soft glass and with the light distributing elements formed on the exterior surface of the face portion including lenticular as well as prism shaped protuberances. In one preferred embodiment, a PAR type lamp glass envelope is blown from a molten hard glass composition wherein a cylindrical neck portion terminates in a parabolic shaped reflector portion closed by a flattened face portion of lesser curvature with lenticular shaped elements being formed on the exterior surface of said face portion and with said face portion being circular in shape. In a different preferred embodiment, an automotive type lamp glass envelope is formed on a ribbon machine with a molten soft glass composition wherein the parabolic reflector portion of said envelope is truncated at opposite sides by substantially flat and parallel surfaces and with the base part being rectangular in shape and provided with light distributing elements on the exterior surface thereof having a prism element pattern of already known configuration.

The basic method of the present invention continuously forms the blown glass envelope from a molten ribbon of glass supported on a moving conveyor which includes the steps of:

(a) blowing a portion of the glass from said molten ribbon into the central cavity of a multi-part mold, said mold including a pair of cooperative halves forming the curved reflector portion of said blown glass envelope by encircling the molten glass while being blown and which mold halves further contain a separate base part at the lower end of said cavity forming a flattened face of lesser curvature in said blown glass envelope with light distributing elements being formed on the exterior surface, (b) said base part being provided with reciprocal motion in a vertical direction, (c) having the base part of said mold move upwardly and remain in an upward position while the glass envelope is being blown but then move downwardly and release the face of the solidified blown glass envelope before the mold halves are opened, (d) opening the mold halves to release the sides of the solidified blown glass envelope, and (e) severing the blown glass envelope from the moving glass ribbon.

In a preferred form of said method for manufacture of the above described PAR type lamp glass envelope, the mold halves include means to form a steam cushion against which the glass envelope is blown, such as the already known ventilated paste type mold and with said mold halves being rotated during formation of the envelope. In forming the above described truncated automotive lamp embodiment according to the present method, however, the mold halves are understandably not rotated when the envelope is being formed.

DESCRIPTION OF THE PREFERRED EMBODIMENTS

Figure 1:
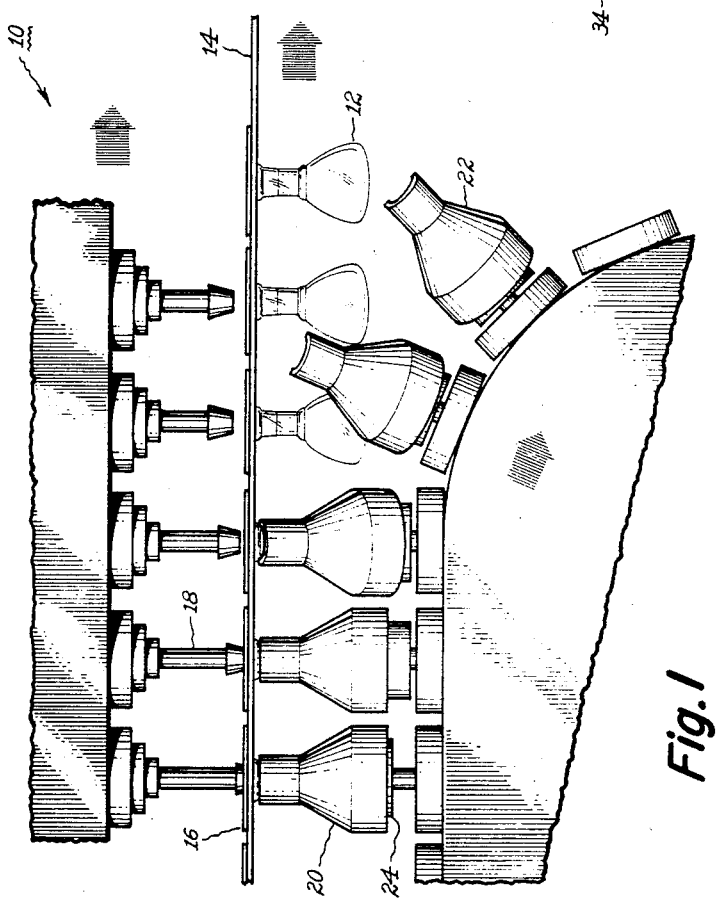
FIG. 1 illustrates a fragmentary side elevation view of an exemplary glass ribbon machine embodying the present invention.

Referring to FIG. 1, there is partially depicted a conventional hot ribbon machine 10 which forms the presently improved lamp glass envelope 12 from a molten ribbon of glass 14 that is being carried on a moving conveyor having interconnected orifice plates 16. The molten glass is blown downwardly by blowheads 18 into the central cavity portions of glass molds 20 constructed in accordance with the present invention. The mold halves 22 are closed while the lamp glass envelope is being blown while the separate base portion 24 of said molds is moved upwardly and retained in the upward position during this step in the manufacturing process. Downward movement of said base part in the molds is automatically carried out on said ribbon machine by conventional means after the molten glass is solidified in the mold cavities as a necessary step before said mold halves are opened. Rotation of the mold halves 22 which can be carried out when the glass envelopes are formed in this manner as well as severing the blown glass envelopes from the moving glass ribbon after the mold halves have been opened are all carried out in the customary manner now being utilized in ribbon machine manufacture.

Figure 2:
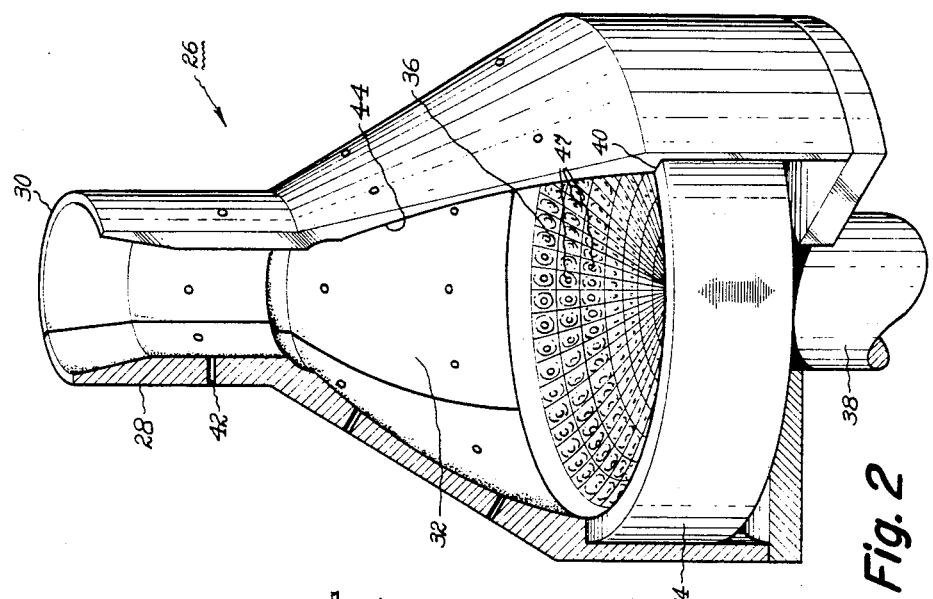
FIG. 2 is a perspective view illustrating a simplified mold design according to the present invention.

A simplified mold construction 26 incorporating the essential structural features required to form the above described lamp envelope embodiment is depicted in FIG. 2. Specifically, a pair of mold halves 28 and 30 cooperate to form the reflector sides of the curved blown glass envelope in a central cavity 32 which terminates in a separate curved base part 34 providing a lesser degree of curvature to the face portion of said glass envelope than its reflector sides. There is included a same pattern of light distributing elements 36 on the upper surface of said curved base part forming the previously mentioned proturbances on the exterior surface of said lamp glass envelope. Said base part 34 is also provided with reciprocal motion in the vertical direction by means of being mounted on a bearing surface 38 and with said upward motion being limited by physical contact with a rim surface 40 machined at the lower end of the cooperating mold halves. In said type mold construction, the cooperating mold halves can be rotated in the customary manner to form a symmetrical lamp glass envelope having sides with a parabolic contour, said mold halves being further provided with ventilated openings 42 along with a paste coating 44 being applied to the inner surface of the central mold cavity. On the other hand, the cooperating surface of base part 34 is devoid of a paste coating but is provided with vent openings 47 to help relieve steam from the mold cavity and produce a more sharply defined pattern in the light distributing elements formed by said surface.

Figure 3:
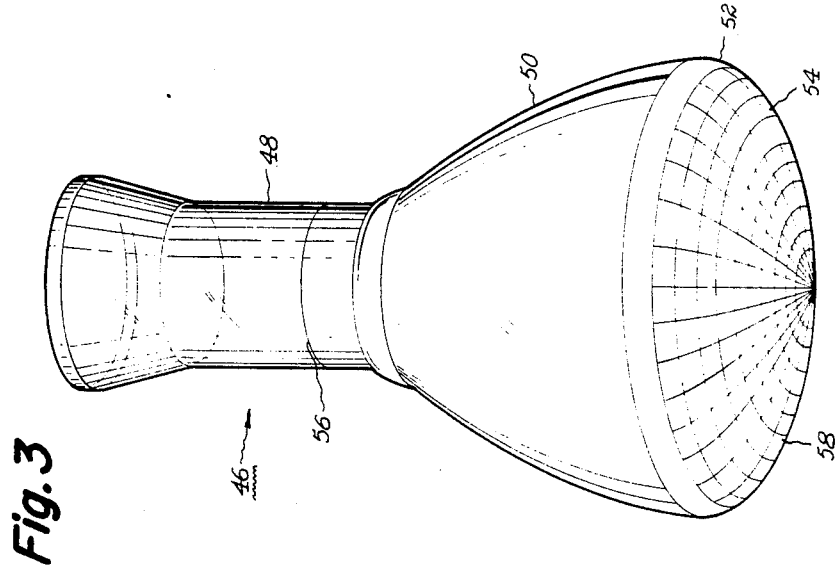
FIG. 3 is a perspective view illustrating one type lamp glass envelope formed according to the present invention.

In FIG. 3 there is depicted a perspective view of a typical PAR type lamp glass envelope according to the present invention. Said ribbon formed lamp glass envelope 46 for a reflector type lamp includes a cylindrical neck portion 48 terminating at one end in a curved reflector portion 50 closed by an integral flattened face portion 52 of lesser curvature having light distributing elements 54 formed on the exterior surface of said face portion. As can be observed, a conventional aluminized reflective coating 56 has been deposited on the inner surface of said curved reflector portion 50 to provide desired light reflection from said reflecting surface. This type lamp glass envelope is customarily formed with a conventional hard glass composition and with said flattened face portion 52 having a circular contour 58. The light distributing elements 54 formed on the exterior surface of the face portion in said lamp glass envelope can also comprise the conventional pattern of lenticule shaped elements now used to shape the light beam pattern emerging from this type lamp construction. Lamp glass envelopes of this type have been found not only to afford a substantial reduction in glass weight but far greater dimensional control with respect to all dimensions as compared with PAR lamps having a pressed glass construction.

Figure 4:
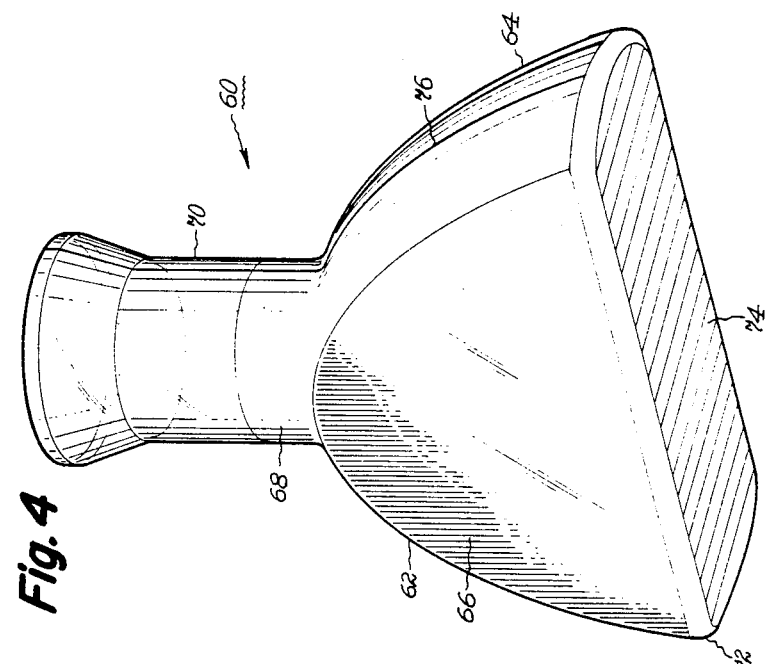
FIG. 4 is a perspective view illustrating a different lamp glass envelope formed according to the present invention.

FIG. 4 is a perspective view of a truncated reflector lamp glass envelope 60 having a generally parabolic reflecting surface 62 which is truncated on opposite sides 64 and 66 by substantially flat and parallel planar surfaces. Said reflecting surface 62 represents an approximately half section or slightly wider portion of a symetrical parabolic reflector which can provide a desired beam control of the reflected light beam pattern emerging from said type lamp construction. For example, said truncated reflector design can be used to eliminate undesirable glare which can otherwise emerge if said lamp is employed for headlight vehicle illumination. Said lamp glass envelope further includes a cylindrical neck portion 70 terminating in said truncated reflector portion 62 which is again closed by an integral flattened face portion of planar contour 72 having light distributing elements 74 formed on the exterior surface of said face portion. Said type lamp glass envelope can be formed with a conventional soft glass composition with the light distributing elements 74 utilizing a customary pattern of prism elements. Base part 72 is rectangular in shape in accordance with the style of headlamps now being used in automotive vehicles. The same type and extent of improvements noted above in connection with the previously described lamp embodiment can be expected for truncated reflector lamps made in accordance with the present invention. As can be observed from the drawing, however, a visible mold seam 76 is produced in the present lamp embodiment due to non-rotation of the mold halves when the glass envelope is being blown.

While preferred embodiments of the present invention along with improved methods for manufacturing said embodiments have been shown and described, various other embodiments along with modifications in the described method of manufacture will become apparent to persons skilled in the art without departing from the spirit and scope of the present invention. For example, a mold construction for use in forming the above described FIG. 4 lamp envelope embodiment does not require a paste coating and vent openings since the mold halves are not rotated. Additionally, the base part of the mold is permitted to rotate slightly in mold designs according to the present invention wherein the mold halves rotate and which avoids distorting the light distributing pattern on the face of the lamp glass envelope while the glass is still molten. The scope of the present invention is thereby limited only to the following claims.

I claim:
1. A ribbon blown glass envelope for a reflector type lamp having a cylindrical neck portion terminating at one end in a curved reflector portion closed by an integral flattened face portion of lesser curvature with light distributing elements formed in the exterior surface of said face portion, and wherein all structural features in said lamp glass envelope are a unitary integral construction when formed at substantially lesser glass wall thickness than found in conventional pressed glass reflector type lamps, said lamp glass envelope having been fully formed in a single metal mode of multipart construction by having a pair of mold halves which rotate to provide curved sides in said glass envelope but which do not rotate when providing planar sides in said glass envelope, and which multipart mold further includes a nonrotating base part that provides said integral flattened face portion of the glass envelope by moving upwardly in place while said glass envelope is being blown in said mold halves but then moves downwardly and releases said glass envelope before the mold halves are opened.

2. A lamp glass envelope as in claim 1 formed with hard glass.

3. A lamp glass envelope as in claim 1 formed with soft glass.

4. A lamp glass envelope as in claim 1 having a parabolic shaped reflector portion and lenticule shaped elements formed on said face portion.

5. A lamp glass envelope as in claim 1 having a rectangular shaped face portion which includes prisms as the light distributing elements.

6. A PAR lamp which includes a ribbon blown envelope of hard glass having a cylindrical neck portion terminating in a parabolic shaped reflector portion closed by an integral flattened face portion of lesser curvature with lenticular shaped elements formed in the exterior surface of said face portion which cooperate in producing the light distribution pattern from said lamp, and wherein all structural features in said lamp glass envelope are a unitary integral construction when formed at substantially lesser glass wall thickness than formed in conventional pressed glass PAR lamps, said lamp glass envelope having been fully formed in a single metal mold of multipart construction by having a pair of mold halves which rotate to provide curved sides in said glass envelope, and which multipart mold further includes a nonrotating base part that provides said integral flattened face portion of the glass envelope by moving upwardly in place while said glass envelope is being blown in said mold halves but then moves downwardly and releases said glass envelope before the mold halves are opened.

* * * * *